UNITED STATES PATENT OFFICE.

SAMUEL G. McADAM, OF ALEDO, ILLINOIS.

COMPOSITION FOR PREVENTING CONCRETE FROM ADHERING TO MOLDS.

1,256,710.  Specification of Letters Patent.  Patented Feb. 19, 1918.

No Drawing.  Application filed October 13, 1917. Serial No. 196,431.

*To all whom it may concern:*

Be it known that I, SAMUEL G. McADAM, a citizen of the United States, residing at Aledo, in the county of Mercer and State of Illinois, have invented certain new and useful Improvements in Compositions for Preventing Concrete from Adhering to Molds, of which the following is a specification.

My invention relates to a composition for coating the interior of molds or forms into which concrete is poured, and the object of the invention is to provide a composition which will prevent concrete from adhering to the mold and thus facilitate disengagement of the forms and the castings.

My invention is particularly adaptable for use with molds made from steel, although it may be advantageously used with molds of other material.

My composition consists of a mixture of bay-berry wax with kerosene oil. The bay-berry wax is heated to the melting point and mixed with the kerosene while in a liquid state, preferably in the proportion of one half pound of bay-berry wax to one gallon of kerosene oil. The proportion may be varied, however, to produce the best results under different conditions. For instance, I have found that in the use of steel molds whose interiors are not smoothly polished, about one pound of bay-berry wax with one gallon of kerosene oil gives better results.

The composition upon cooling, solidifies, but as it is best applied to the molds in liquid form it may be quickly made ready for use by the application of a small amount of heat, or the vessel in which it is contained may be placed in hot water.

The advantage of this mixture over other compositions heretofore used for this purpose is that the formation of air bubbles between the concrete and the mold is largely overcome. This, and the fact that the composition prevents adhesion to the mold, enables the production of castings of comparative smoothness. The use of my composition will also keep the molds in a polished condition and tend to prevent the formation of rust.

I claim as my invention:—

A coating for preventing plastic material from adhering to molds, composed of bay-berry wax and kerosene.

In testimony whereof, I have hereunto subscribed my name.

SAMUEL G. McADAM.

Witnesses:
M. E. TORENQUIST,
A. P. LEANDOR.